United States Patent
Mishra et al.

(10) Patent No.: US 7,602,713 B2
(45) Date of Patent: Oct. 13, 2009

(54) DATA SWITCH AND A METHOD FOR BROADCAST PACKET QUEUE ESTIMATION

(75) Inventors: Shridhar Mubaraq Mishra, Berkeley, CA (US); Guruprasad Ardhanari, Singapore (SG)

(73) Assignee: Infineon Technologies AG, Munich (DE)

( * ) Notice: Subject to any disclaimer, the term of this patent is extended or adjusted under 35 U.S.C. 154(b) by 538 days.

(21) Appl. No.: 10/526,529

(22) PCT Filed: Sep. 2, 2002

(86) PCT No.: PCT/SG02/00203

§ 371 (c)(1),
(2), (4) Date: Mar. 2, 2005

(87) PCT Pub. No.: WO2004/021669

PCT Pub. Date: Mar. 11, 2004

(65) Prior Publication Data

US 2006/0126550 A1 Jun. 15, 2006

(51) Int. Cl.
*G01R 31/08* (2006.01)
(52) U.S. Cl. ............................ 370/232; 370/252
(58) Field of Classification Search ............... 370/415, 370/315, 412–413, 429, 232, 389, 241, 392, 370/252
See application file for complete search history.

(56) References Cited

U.S. PATENT DOCUMENTS

| | | | | |
|---|---|---|---|---|
| 4,818,984 | A | * | 4/1989 | Chang et al. ............. 340/10.31 |
| 5,636,345 | A | * | 6/1997 | Valdevit ..................... 709/224 |
| 6,081,532 | A | * | 6/2000 | Fiammante ................. 370/401 |
| 6,292,492 | B1 | | 9/2001 | Bonomi et al. |
| 6,587,471 | B1 | * | 7/2003 | Bass et al. ................... 370/432 |
| 6,851,000 | B2 | * | 2/2005 | Lai ............................ 710/57 |
| 7,184,421 | B1 | * | 2/2007 | Liu et al. .................... 370/338 |
| 7,383,574 | B2 | * | 6/2008 | Burrows et al. ............... 726/13 |
| 7,408,876 | B1 | * | 8/2008 | Gupta et al. ................ 370/230 |
| 2001/0026555 | A1 | * | 10/2001 | Cnodder et al. ............. 370/412 |
| 2002/0073338 | A1 | * | 6/2002 | Burrows et al. ............. 713/201 |
| 2002/0136230 | A1 | * | 9/2002 | Dell et al. ................... 370/416 |
| 2004/0062200 | A1 | * | 4/2004 | Kesavan ..................... 370/235 |

FOREIGN PATENT DOCUMENTS

| | | |
|---|---|---|
| WO | WO 00/38375 A1 | 6/2000 |
| WO | WO 01/65765 A2 | 9/2001 |

\* cited by examiner

*Primary Examiner*—Kwang B Yao
*Assistant Examiner*—Candal Elpenord
(74) *Attorney, Agent, or Firm*—Maginot, Moore & Beck

(57) ABSTRACT

A data switch includes ingress ports associated with ingress queues (3) and egress ports associated with egress queues (9). The length of the ingress queues (3) is measured, and the level of broadcast packets arriving at the ingress ports is thereby estimated. Based on this estimate it is determined whether or not the level of broadcast packets is excessive, and in this case broadcast storm control is carried out.

4 Claims, 1 Drawing Sheet

DATA SWITCH AND A METHOD FOR BROADCAST PACKET QUEUE ESTIMATION

FIELD OF THE INVENTION

The present invention relates to a data switch and to a method of operating it.

BACKGROUND OF INVENTION

One of the types of data packets which Ethernet switches are required to transmit are broadcast packets, i.e. packets which are to be transmitted from one of the ingress ports to all of the egress ports, except the egress port corresponding to the ingress port ("source port") from which the broadcast packet arrived. Shared memory output queue Ethernet switches cannot sustain excessive levels of broadcast packets, because the memory requirements increase linearly with the percentage of broadcasts in a traffic stream. This means that there is a need to limit the number of broadcasts in the system.

In the case that it is identified that the number of broadcast packets is excessive, it is known to delete selected ones of the broadcast packets, e.g. selectively based on a parameter in the header of the packet defining the importance of the packet. This is referred to as "broadcast storm control" (BSC).

Conventional methods to identify excessive amounts of broadcast packet traffic operate by counting the number of broadcasts per unit time. Once this value rises above a predefined level, BSC is turned on. When the figure drops below the predetermined level (e.g. by a certain amount, so that there is a hysteresis), BSC is turned off. This method suffers from the problem that it requires a counter for explicitly counting the broadcast packets. Additionally, since the count must be worked out per unit time, a timer is required, e.g. to decrement the counter every timer interval.

SUMMARY OF THE INVENTION

The present invention proposes a new and useful manner of determining excess levels of broadcast packets, in particular so that BSC can be carried out.

In general terms the invention proposes that the length of the respective queues at the ingress ports is measured, and the level of broadcast packets is estimated, or in some circumstances exactly determined, based on these lengths. The method is motivated by the observation that a broadcast packet takes longer than a normal packet to pass through the switch, and therefore causes the length of the queue to grow. In wirespeed unicast systems with one-to-one traffic flow, broadcast packets are in fact the only types of packets which can cause the ingress queues to lengthen.

From the level of the broadcast packets, a determination is made of whether or not the level is excessive, and in this case BSC can be carried out, for example according to the conventional methods described above. For example, BSC can be carried out whenever the system determines that the length of any of the queues rises above a predetermined level, since the length of that queue provides a measure of the frequency of arrival of broadcast packets (at the corresponding ingress port).

BRIEF DESCRIPTION OF THE FIGURES

Preferred features of the invention will now be described, for the sake of illustration only, with reference to FIG. 1, which shows schematically a switch according to the invention.

DETAILED DESCRIPTION OF THE EMBODIMENTS

Figure 1:
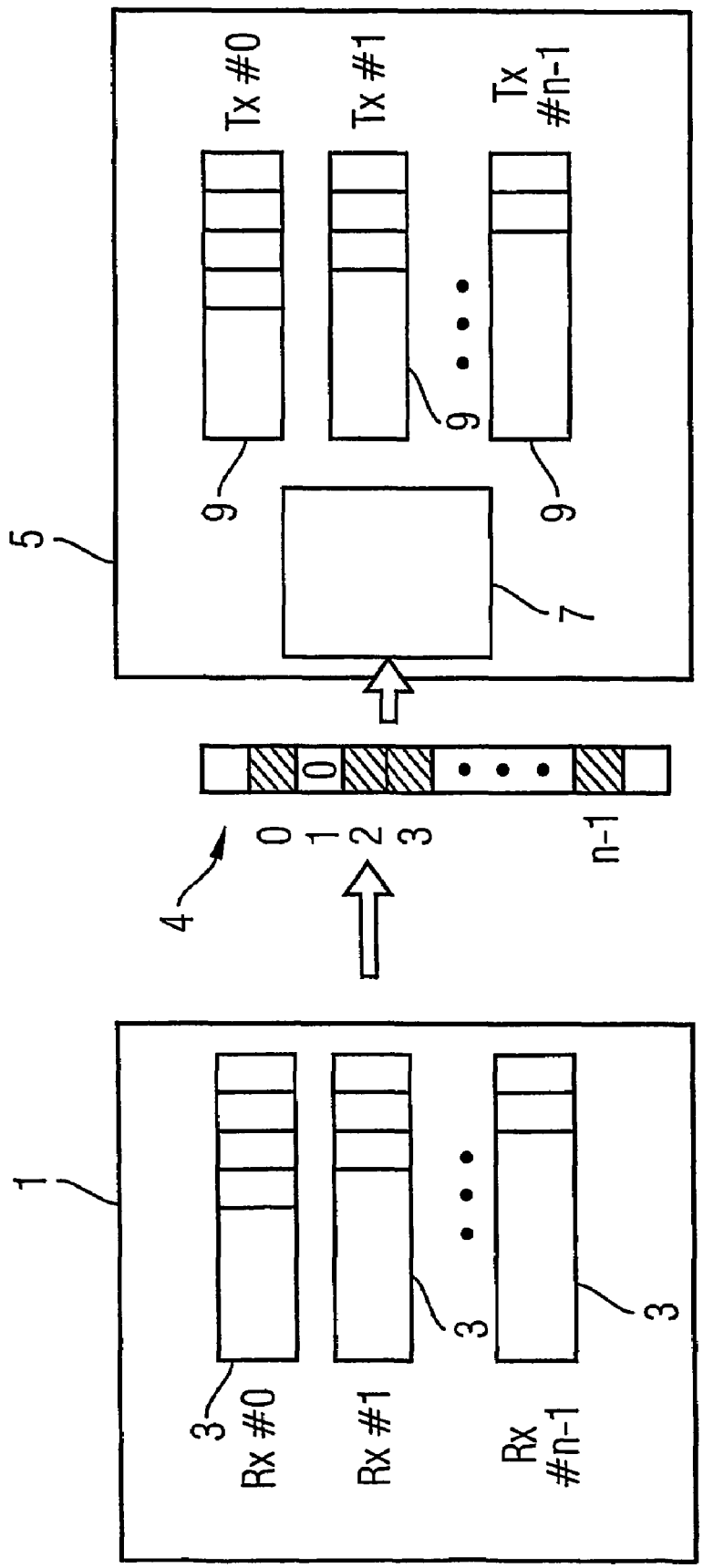

Referring to FIG. 1, a Ethernet switch which is an embodiment of the invention is shown. According to conventional structures, the Ethernet switch has a number of ingress ports n and a corresponding number n of egress ports. Data packets arrive at the ingress ports for transmission across a switching fabric to the egress ports.

The Ethernet switch has a packet resolution module 1 including a respective ingress queue 3 for each ingress port. The ingress queues are marked from Rx#0 up to Rx#n−1. The packet resolution module 1 determines a destination list for each packet arriving at a certain ingress port (i.e. a list of the egress ports to which it should be transmitted), and stores this information in the corresponding queue. The destination list for a typical packet is labelled 4 in FIG. 1, and includes for each of the n destinations either an indication that the packet is to be sent there (marked in destination list 4 as a black square), or that it is not (marked as a 0). The destination list 4 shown in FIG. 1 is for a broadcast packet having ingress 1 as the source port, so that it is 0 for destination 1, and a black square for all other destinations.

The Ethernet switch further includes a queue management module 5 having a scheduler 7 and a respective egress queue 9 for each of the n egress ports. The egress queues are marked from Tx#0 up to Tx#n−1. The scheduler 7 in the queue management module 5 processes packets from each ingress port in a round-robin manner. For each packet the packet details are transmitted into all the egress queues specified in the destination list for that packet. The time taken for this insertion depends upon the amount of parallelism available in the queue management module 5, and is referred to as the scheduler bandwidth, which may be 5 insertions per unit time.

Each of the broadcast packets have to be inserted into each of the egress queues (except the source port), so if a broadcast packet arrives in the ingress queue structure every unit time, the scheduler must have a bandwidth of n−1 to match the ingress bandwidth (even in the absence of other packets). If the scheduler bandwidth is less than this, the ingress queue sizes will increase.

Specifically, suppose that the packet rate at each ingress port is M packets per unit time ($0 \leq M \leq 1$), so that the total number of packets arriving at the switch per unit time is NM. Suppose that the broadcast traffic as a fraction of all traffic is b ($0 \leq b \leq 1$), and that the actual scheduler bandwidth is S per unit time. In this case, the required scheduler rate is $NM(1-b)+bNM(N-1)$ which is equal to $NM(1+(N-2)b)$ per unit time. The difference between the egress and ingress rates is thus $NM(1-b)+bNM(N-1)-S$, and the rate of increase of the ingress queues is therefore $\{NM(1-b)+bNM(N-1)-S\}/N$.

In the embodiment, the packet resolution module 1 is arranged to determine the length of each of the queues, and according to the lengths determine if BSC should be applied. Preferably, the packet resolution module determines that this is the case when it finds that the length of any one of the queues rises above a predetermined level. Alternatively (or additionally), the packet resolution module may determine that this is the case when it finds that the total length of the n queues (i.e. the sum of the lengths of the n queues) rises above this predetermined maximum.

Once BSC has been applied, the packet resolution module 1 continuously monitors whether it must be turned off again. For example, if the BSC was triggered by the length of any one of the queues rising above a predetermined level, the BSC may be removed again in the case that it is found that the length of that queue has now fallen below a second predetermined level. Similarly, in the case that BSC was triggered by the total length of the queues rising above the predetermined level, the BSC may be removed in the case that it is found that the total length of the queues falls below a second predetermined level. In either case, the second predetermined level must be no higher than the first predetermined level, and is preferably lower since this provides a hysteresis.

Although only a single embodiment of the method has been described above, the invention is not limited in this respect and many variations are possible, just as there are many known designs of Ethernet switch. In particular, different Ethernet switches manage their ingress ports in different manners, but the general principle of measuring the lengths of ingress queues and obtaining from them a measure of the proportion of broadcast packets remains valid.

The invention claimed is:

1. An arrangement in a data switch having at least one ingress ports and a plurality of egress ports connected by a switching fabric, the arrangement comprising:
    at least one ingress queues configured to queue data derived from data packets received at the ingress ports;
    a broadcast packet estimation unit configured to determine the length of the at least one ingress queues; and
    a broadcast packet control unit having a broadcast storm control mode in which the broadcast packet control unit performs a broadcast storm control operation, the broadcast packet control unit configured to operate in broadcast storm control mode if the obtained measure of the length of the at least one ingress queue rises above a first predetermined level before the data packets are queued in the at least one ingress queue, wherein the broadcast packet control unit is configured to only admit broadcast packets to the at least one ingress queue when not in broadcast storm control mode.

2. The arrangement according to claim 1 further comprising a plurality of ingress queues wherein the broadcast packet estimation unit is configured to determine the length of the at least one ingress queue as the length of the longest of the ingress queues.

3. The arrangement according to claim 2 wherein the broadcast packet control unit is configured to perform the broadcast storm control by deleting at least some of the broadcast packets.

4. The arrangement according to claim 1 wherein the broadcast packet control unit is configured to perform the broadcast storm control by deleting at least some of the broadcast packets.

* * * * *

UNITED STATES PATENT AND TRADEMARK OFFICE
CERTIFICATE OF CORRECTION

PATENT NO. : 7,602,713 B2  Page 1 of 1
APPLICATION NO. : 10/526529
DATED : October 13, 2009
INVENTOR(S) : Mishra et al.

It is certified that error appears in the above-identified patent and that said Letters Patent is hereby corrected as shown below:

On the title page:
Item (75): replace "Shridhar Mubaraq Mishra, Berkeley, CA (US)" with -- Shridhar Mubaraq Mishra, Berkeley, CA (IN) --

Item (75): replace "Curuprasad Ardhanari, Singapore (SG)" with -- Curuprasad Ardhanari, Singapore (IN) --

Signed and Sealed this

Nineteenth Day of October, 2010

David J. Kappos
*Director of the United States Patent and Trademark Office*